Dec. 22, 1942.   H. C. IRVIN   2,305,698
UNIVERSAL COUPLING
Filed Sept. 29, 1941   3 Sheets-Sheet 1
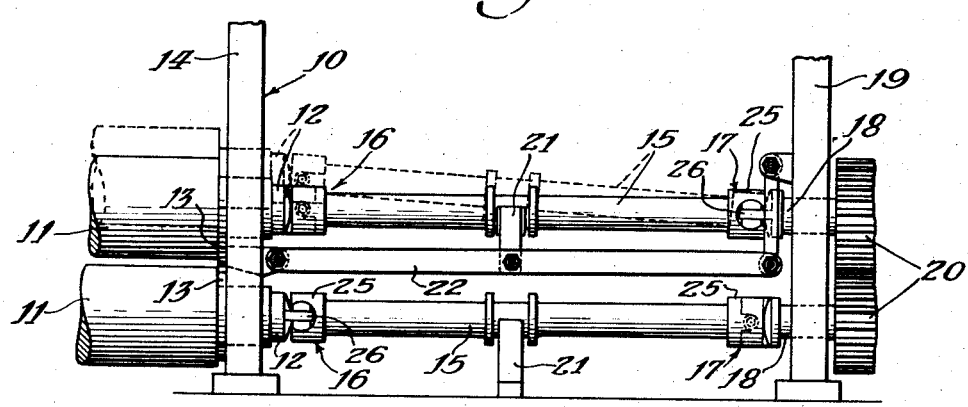
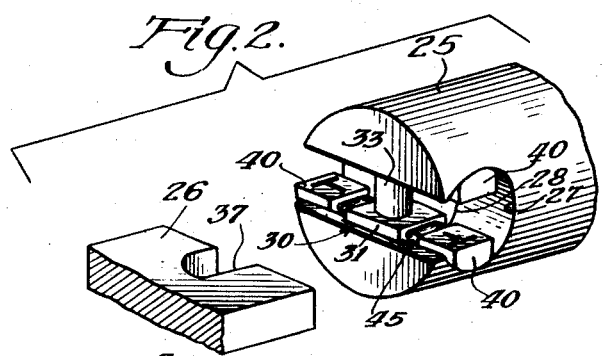
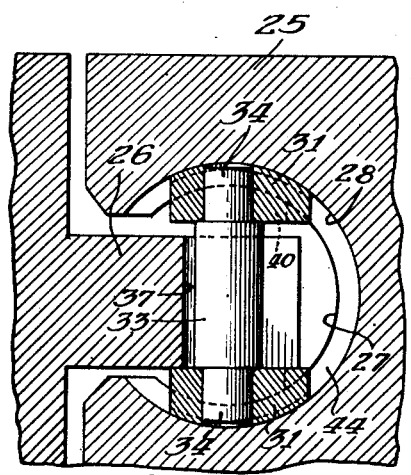
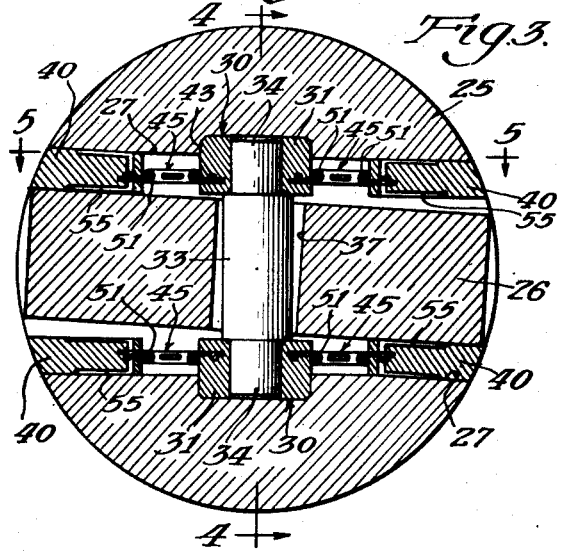
Inventor:
Harry C. Irvin
By Wallace & Cannon
Attorneys Dec. 22, 1942.   H. C. IRVIN   2,305,698
UNIVERSAL COUPLING
Filed Sept. 29, 1941   3 Sheets-Sheet 2
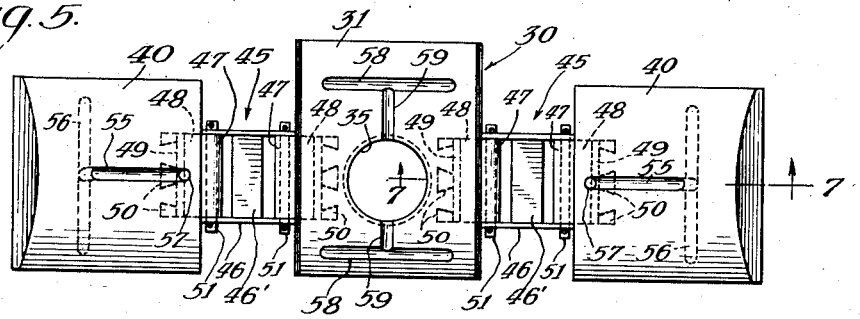
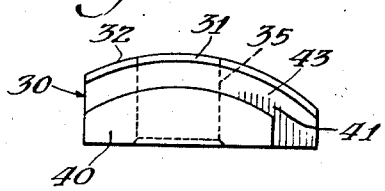
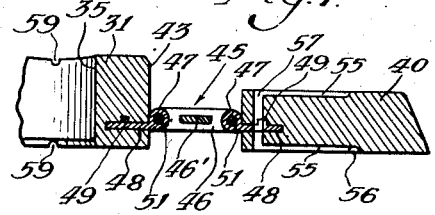
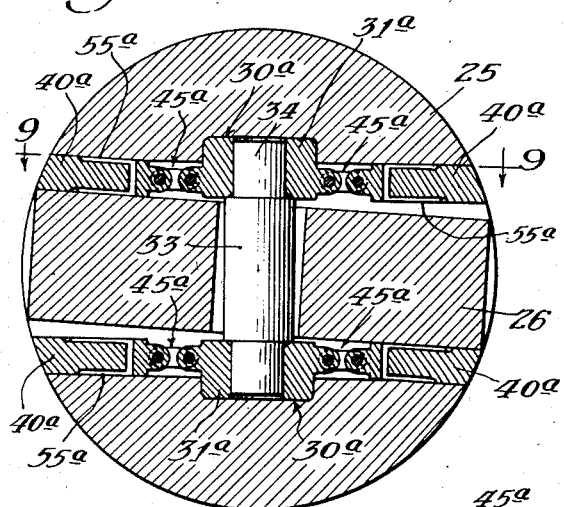
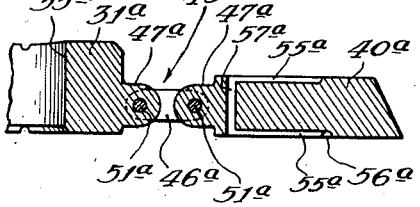
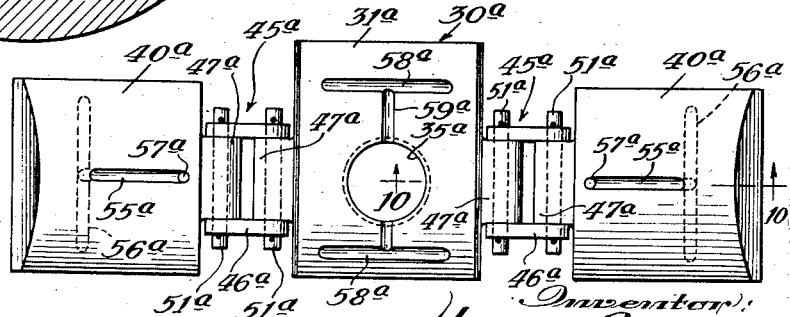
Inventor:
Harry C. Irvin
By Wallace and Cannon
Attorneys Dec. 22, 1942.    H. C. IRVIN    2,305,698
UNIVERSAL COUPLING
Filed Sept. 29, 1941    3 Sheets-Sheet 3
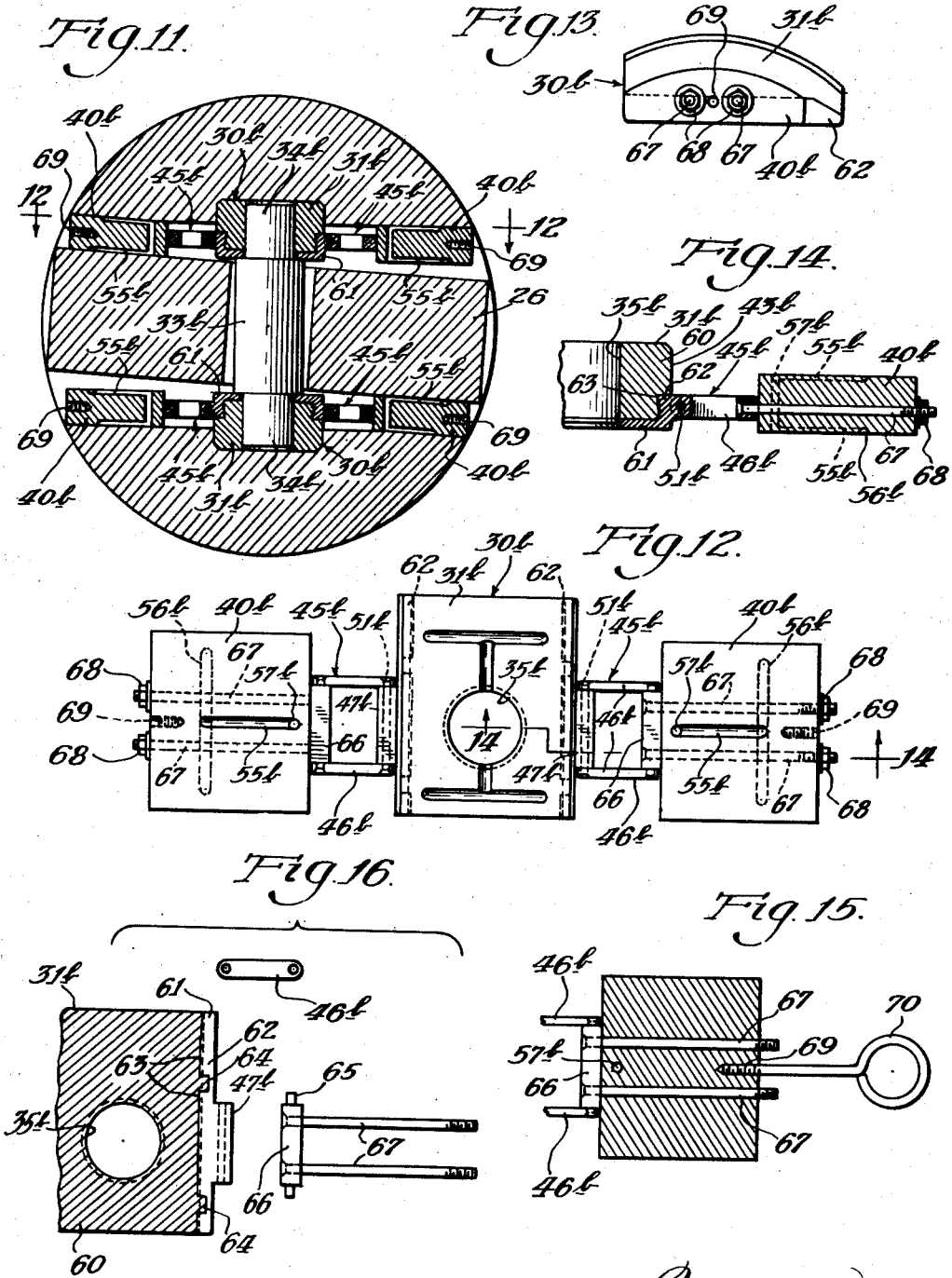

Patented Dec. 22, 1942

2,305,698

UNITED STATES PATENT OFFICE 2,305,698

UNIVERSAL COUPLING

Harry C. Irvin, Detroit, Mich., assignor to The American Brake Shoe and Foundry Company, Wilmington, Del., a corporation of Delaware Application September 29, 1941, Serial No. 412,737

18 Claims. (Cl. 64—7)

This invention relates to bearings and particularly to slipper bearings for universal couplings and the like.

In the transmission of mechanical power between, for example, operable parts of machinery there are many instances in which torque is imparted from a driving shaft to a driven shaft that is arranged in end to end relation with the driving shaft and this is frequently done in circumstances in which the shafts are not at all times axially aligned one with the other. In such instances it is necessary to interconnect the shafts by universal couplings or the like to enable the driving connection between the shafts to be maintained despite an angular relation therebetween. In a conventional form of universal coupling that has been used in such instances cooperating male and female members are respectively formed on or secured to the adjacent ends of the shafts, the male member consisting of a flat tongue or fishtail which is inserted into a bifurcation afforded in a female member. The branches of the bifurcated female member are arcuately recessed transversely thereof and such recesses are located so as to be so associated with the aforesaid tongue when it is inserted into the bifurcation as to define a pair of opposed semi-cylindrical pockets located on opposite sides of the tongue. A slipper bearing is disposed in each of the aforesaid pockets or recesses and such bearing has a convex surface that conforms to the configuration of the recess and also a flat face that conforms to an adjacent face of the aforesaid tongue and such slipper bearings are maintained in spaced relation by a bearing pin which passes through a suitable opening in the tongue. In instances where the shafts are rotated under circumstances where they are not in axial alignment, the angular relation of the tongue and female member changes constantly whereupon the slipper bearing rocks within the recesses in the female member and the tongue pivots about the bearing pin whereby pivotal movement about angularly related axes is afforded.

In the usual slipper bearing, the medial portion, known as the boss, is provided with an opening which serves as a pocket to receive an end of the bearing pin, and usually this boss is of greater thickness than the end portions of the bearing. Correspondingly, the portions of the recesses or arcuate bearing portions of the female member which mate with the slipper bearings are more deeply recessed at the medial parts thereof than are the remaining parts thereof to thereby accommodate both the thickened boss and the end portions of the bearings.

It has been observed in the operation of universal couplings of the aforesaid character that the major portion of the wear attendant to operation of the coupling occurs at the end portions of the slipper bearings and the parts of the female member with which such end portions cooperate and where the female portions are so worn and it becomes necessary to replace one slipper bearing with another, there will be instances where, until the new slipper bearing wears down so as to conform to the worn portions of the female member, the slipper bearing will be subjected to appreciable stresses and strains.

The wear of the female bearing portion of the coupling may vary considerably in various coupling installations, and when a slipper bearing is placed in an operative relation in a worn coupling, the application of driving torque between the two members of the coupling tends to bend the slipper bearing so as to conform with the worn surface of the female member of the coupling. This action tends to produce breakage of the slipper bearing adjacent the central portion thereof and since such slipper bearings usually embody a central boss which functions in preventing endwise displacement of the bearings, such breakage takes place at or near the juncture of the end portions of the slipper bearing with the boss portion thereof.

In the use of slipper bearings of the type to which the present invention pertains another type of stress is often encountered by reason of endwise shifting or pounding of the drive spindle. In such endwise pounding of the drive spindle the fishtail exerts a substantial pounding action upon the spacing pin of the slipper bearing assembly, tending to displace the slipper bearings transversely of the arcuate recesses of the female member of the coupling. Since the boss portion of each slipper bearing is normally spaced from the bottom of the groove in which the boss portion rides, the boss portions are, in such conventional slipper bearings, usually ineffective to absorb or resist the pounding forces exerted by the spindle in its endwise shifting or pounding movement. As a result, this force must be resisted by the engagement of the end portions of the slipper bearing with the arcuate bearing surfaces of the female portion of the coupling. The location or spacing of such points of engagement may vary considerably but in every instance these points are spaced in opposite directions from the point of engagement of the spacing pin with the central boss. Hence the slipper bearings in such an instance act as beams supported at spaced points between which the spacing pin exerts a substantial pounding or loading force. This action often results in breakage of the slipper bearing transversely thereof and substantially through the central opening of the boss.

In view of the foregoing, among the important objects of the present invention are to enable slipper bearings to withstand such forces of the aforesaid character, and so design the bearings as to avoid the production of destructive bending or breaking forces if exceptional operating conditions are encountered.

Other objects of the present invention are to so improve the construction of slipper bearings of the aforesaid character as to enable the bearings to withstand bending stresses which tend to cause breakage thereof and other damage thereto and to effect this by enabling relative movement to take place between portions of a slipper bearing whereat breakage is likely to occur in the event bending stresses or the like are impressed on the bearing.

More particularly, it is an object of the invention to provide a three-piece slipper bearing in which each end section is pivotally interconnected with the boss of the bearing by linkage in the nature of a doubles hinge which affords a high degree of flexibility in the bearing.

A further object is to enable the end sections of a three-piece slipper bearing to be readily separated from the bearing assembly without requiring disassembling of the universal coupling in which such bearing is embodied, thereby facilitating inspection of the end sections and replacement of worn or otherwise damaged end sections.

The features, hereinabove referred to, of pivotally interconnecting the parts of a slipper bearing and rendering the end sections thereof removable are disclosed in the co-pending applications of Thomas J. Healy, Ser. Nos. 412,750 and 412,751, respectively, both filed September 29, 1941, and the present invention relates to improvements over the inventions there disclosed.

Other and further objects of the present invention will be apparent from the following description and claims and will be understood by reference to the accompanying drawings which, by way of illustration, show preferred embodiments and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

In the drawings,

Fig. 1 is a fragmental elevational view of a portion of a rolling mill;

Fig. 2 is a fragmental perspective view of a universal coupling in partially disassembled condition, showing the manner in which one form of my novel slipper bearing structure is embodied in the coupling;

Fig. 3 is a cross-sectional view of the aforesaid universal coupling;

Fig. 4 is a lonigtudinal sectional view of the coupling taken on the line 4—4 on Fig. 3;

Fig. 5 is a plan view of one form of slipper bearing;

Fig. 6 is an end elevational view looking from the right in Fig. 5;

Fig. 7 is a longitudinal sectional view taken on the line 7—7 on Fig. 5;

Fig. 8 is a cross-sectional view of a universal coupling similar to Fig. 3 but illustrating a different form of slipper bearing;

Fig. 9 is a plan view of the slipper bearing shown in Fig. 8;

Fig. 10 is a longitudinal sectional view taken on the line 10—10 on Fig. 9;

Fig. 11 is a cross-sectional view of a universal coupling illustrating still another form of bearing structure;

Fig. 12 is a plan view of the slipper bearing shown in Fig. 11;

Fig. 13 is an end elevational view looking from the right in Fig. 12;

Fig. 14 is a longitudinal sectional view taken on the line 14—14 on Fig. 12;

Fig. 15 is a plan sectional view of an end section of the slipper bearing illustrated in Fig. 12, showing a device for facilitating removal of the end section; and Fig. 16 comprises a plan sectional view of the boss of the slipper bearing shown in Fig. 12, combined with detail views of associated parts of the bearing structure.

Slipper bearings of the character to which the present invention relates are commonly employed in the drives for the continuous type of steel rolling mills and the like, such as the mill 10 fragmentally illustrated in Fig. 1. The rolling mill 10 comprises a pair of opposed rolls 11 having reduced end portions or pintles 12 journaled in bearings 13 carried by frame members as 14, and these pintles 12 are connected by universal couplings 16 to the ends of spindles 15. The other ends of the spindles 15 are connected by universal couplings 17 to stub shafts 18 journaled in a frame member 19, gearing 20 being carried by the stub shafts 18 for connecting these shafts to the driving means (not shown). To afford adjustability of the rolls 11 in accordance with the thickness of the material that is to be worked upon, the bearings as 13 are arranged to be vertically positioned at selected points in the frame members as 14. Thus the upper roll 11 may be adjusted from the full-line position thereof in this view to accommodate a greater thickness of material, thus causing the upper spindle 15 to assume the position indicated by broken lines so that this spindle 15 is angularly disposed with respect to the associated pintle 12 and stub shaft 18. The lower spindle 15 is supported at its middle by a thrust or spindle carrier bearing 21 which is supported in any suitable manner. The upper spindle 15 is carried by a spindle carrier bearing 21 which is mounted on a linkage 22 attached to the bearing 13 of the upper roll 11, and as the position of the upper spindle 15 is changed in the manner just described the bearing 21 is correspondingly repositioned so that it may continue to support this spindle.

The universal couplings 16 and 17 which interconnect the spindles 15 with the rolls 11 and stub shafts 18 afford driving connections between these various rotatable members even though they are not longitudinally aligned with each other. As shown in detail in Fig. 2, each universal coupling comprises a female member 25 which is formed on or secured to an end of a spindle as 15, Fig. 1, and a male member 26 which is provided on the adjacent end of an associated stub shaft as 18 or a pintle as 12. The male member 26 is in the form of a flat tongue that may be inserted into a bifurcation in the female member 25. Arcuate or cylindrical recesses 27, Figs. 2 and 4, are formed in the branches of the bifurcation in the female member 25 and extend transversely to the free edges thereof, and deeper recesses 28 concentric with the recesses 27 are afforded in the member 25 between the free ends of the semi-cylindrical openings defined by the recesses 27.

A pair of slipper bearings 30 are respectively interposed between the tongue 26 and the arcuate recesses in the branches of the bifurcation in the female member 25, as shown in Fig. 3, each such slipper bearing 30 having flat and convex surfaces to conform respectively with the tongue 26 and the semi-cylindrical recesses in the female member 25. The medial or boss portion 31 of each slipper bearing 30 is of greater thickness than the end sections 40 of the bearing, and these bosses 31 seat in the deeper recesses 28 while the end sections 40 are seated in the recesses 27. The bosses 31 of the slipper bearings 30 are interconnected and maintained in spaced relation with each other by a bearing pin 33 having reduced end portions 34 which are received in socket openings as 35, Fig. 5, in these bosses, the pin 33 passing through a suitable slot or other opening 37 in the tongue 26.

Where the shafts which are interconnected by a universal coupling 16 or 17 are not axially aligned, as is the case when the upper spindle is in the broken-line position thereof shown in Fig. 1, the slipper bearings 30 are rocked back and forth in their recesses 27 and 28, Figs. 3 and 4, as the angular position of the tongue 26 with respect to the female member 25 changes in the course of rotation of these parts. However, longitudinal movement of the slipper bearings 30 is prevented by the end faces 43 of the bosses 31 which are engaged by the shoulders 44, Fig. 4, intermediate the recesses 27 and 28 in the female member. Thus, the tongue 26 may pivot about two axes, one being afforded by the bearing pin 33 and the other by the generally cylindrical or concentric surfaces of the recesses 27 and 28 in which the slipper bearings are seated.

As is indicated in somewhat exaggerated fashion in Fig. 3, the rotative force or reaction exerted by the tongue 26 upon each slipper bearing 30 is borne substantially entirely by only one of the end sections 40 of each such bearing in instances where the direction of rotation remains substantially constant. These heavily stressed end sections 40 of the slipper bearings 30 and the cooperating portions of the female member 25 undergo a relatively rapid rate of wear, and this wear is greatest on both of the opposed surfaces adjacent to the ends of the slipper bearings. As the support for such end sections becomes weakened due to changes in the configuration of the mating surfaces there is a tendency for these end sections to bend relative to the bosses 31 of the slipper bearings, particularly when these bosses are firmly seated in the recesses 28 in the manner explained hereinafter. As stated hereinabove, it is a purpose of the present invention to enable such bending movement and relative readjustment of the more heavily stressed end sections 40 to take place without unduly straining the slipper bearing assembly.

In the embodiment of the invention illustrated in Figs. 2 to 7, inclusive, the end sections 40 of each slipper bearing 30 are linked to the boss 31 thereof in such a manner as to render each end section 40 capable of pivotal movement relative to the boss 31, thereby enabling such end section 40 to adjust itself independently to the configuration of the cooperating arcuate bearing surface 27 in the female member 25 of the coupling without placing an undue strain upon the slipper bearing assembly. The link connection generally designated 45, Figs. 5 and 7, interposed between each end section 40 and its associated boss 31 comprises a pair of links 46, each of which is pivotally connected at its ends to knuckles 47 formed on lugs or straps 48 that are respectively secured to the boss 31 and end section 40. The linkage 45 may be reinforced by a crossbar 46' secured, as by welding, to each link of the pair of links 46. When the end sections and the boss of a slipper bearing are molded as from composition material or resin impregnated laminated fabric or the like, these parts may be conveniently molded around the straps 48 to thereby anchor the knuckles 47 to these parts, and to further effectuate a firm union, the imbedded portions of the straps 48 may be provided with ribs 49 and dovetail projections 50, Figs. 5 and 6. The knuckles 47 project from the opposing faces of the boss 31 and end sections 40 and are adapted to receive pivot pins or rivets 51 which are passed through suitable openings in the links 46 to thereby pivotally interconnect the links 46 and knuckles 47.

Thus, in effect, a double hinged connection is afforded between each end section 40 and the boss 31 of the slipper bearing 30, and this enables the slipper bearing to give satisfactory service despite badly worn conditions of the end sections of the bearing or of the cooperating portions of the female member 25. For example, assuming that the portions of the arcuate bearing surface 27 of the female member 25 cooperating with the more heavily stressed end sections 40 of the slipper bearing 30 have been relieved due to wear, as indicated in a somewhat exaggerated manner in Fig. 3, these end sections 40 may nevertheless be urged by the tongue 26 into intimate contact with the bearing surface 27 without any tendency to strain the slipper bearing assembly as a whole. Not only is each end section 40 able to pivot relative to the connected links 46, Figs. 7, but each pair of links may pivot relative to the boss 31, thereby preventing the occurrence of bending strains between the end sections and bosses of the slipper bearings as the more heavily stressed end sections are urged by the tongue 26 toward the cooperating surfaces on the female member 25.

In those instances where the couplings or other elements of the driving connection have become so worn as to allow endwise shifting or pounding movement of the spindle 15, it has been found that detrimental and destructive forces are applied to the slipper bearings. In such shifting movement of the spindle 15 the pounding action of the spindle is exerted through the tongue 26 upon the bearing pin 33 transversely of the bearing pin, and this force is in turn exerted upon the boss portions of the slipper bearings through the reduced end portions 34 of the bearing pin. In slipper bearings as heretofore constructed it has been the practice to so form the boss portions 31 as to space the arcuate outer surface thereof from the arcuate bottom surface of the groove 28, and hence the boss portions 31 have been ineffective under such circumstances to resist the force thus applied through the bearing pin 33. Such forces have therefore been resisted by engagement of the end portions of the slipper bearings with the arcuate bearing surfaces 27. In most instances the engagement of the end portions of the slipper bearings with the bearing surfaces 27 occurs at points spaced at substantial distances on opposite sides of the bearing pin 34, and hence the force exerted by the bearing pin 33 has been applied to the slipper bearings so as to stress the slipper bearing as a simple beam. This action often results in breakage of the slipper bearing at substantially the mid point of the boss section or, in other words, through the pin receiving opening such as the opening 35.

In accordance with the present invention, this objectionable result is avoided by so constructing and arranging the slipper bearings and the resulting slipper bearing assembly that these pounding forces are resisted without the aforesaid beam action in the slipper bearings. This end is attained through formation of the boss section 31 of such thickness that its arcuate surface 32 may seat against the bottom of the groove 28 when a pounding force is exerted thereon due to endwise shifting of the spindle 15. It will be noted in this connection that the ends 34 of the pin 33 are so formed, Figs. 3 and 4, that the pin ends do not engage the bottom of the groove 28. In obtaining this seating or bottoming action of the bosses it will be observed that when the spindle shifts to the right in Fig. 4, it engages the bearing pin 33 so as to move the two boss portions 31 more firmly into seating engagement with the bottom of the groove 28. Hence the two boss portions 31 ride along converging arcuate surfaces of the groove 28 and are forced toward each other and into firm engagement with the oppositely facing shoulders formed on the pin 33, as a result the endwise movement of the spindle 15 is limited by a wedging action of the two boss portions in the groove 28.

Since the pounding force of the spindle must in this action be resisted in the non-metallic bearing material of the boss portions 31, these boss portions are extended to the right from the central opening 35 for a distance which is considerably greater than the extent to the left, Fig. 4. This additional material in the boss portion provides for better distribution of the pounding forces and results in longer life in the boss portion.

While such wedging action of the bosses 31 is effective to resist such endwise pounding forces and eliminate at least in part the production of beam-like stresses in various types of slipper bearings, including those in which the boss and end sections are integrally formed, and it is to be observed that where the end sections are so joined to the boss as to permit relatively free readjustment such as that which is afforded by the hinge means 45, the wedging of the bosses may be accomplished freely and without the production of related or resulting stresses in other parts of the slipper bearings. Hence the bosses 31 cooperate with the pin 33 and with the flexible character of the slipper bearings in resisting the endwise pounding forces independently of the end sections of the slipper bearings.

As indicated in Fig. 3, the rotative force transmitted between the tongue 26 and female member 25 tends to be applied upon only one of the end sections 40 of each slipper bearing 30. As to the other end section 40 of each slipper bearing, there may be a certain amount of excessive clearance between it and the tongue 26 which might enable undesired movement of such an end section if the link connection 45 were to afford a freely pivoted movement between such end section 40 and the boss 31 of the slipper bearing 30. However, since it is advisable to provide a certain amount of clearance between the tongue 26 and the slipper bearings 30 to facilitate assembling the universal coupling, it is therefore necessary to resort to an arrangement which will prevent undesired movement of the bearing end sections 40, which are not under stress when the parts of the universal coupling are rotated, relative to the bosses of the bearings of which such end sections are a part. In order to accomplish this the pins 51 which serve as pivots in the link connections 45, Figs. 3, 5 and 7, have a tight driven fit and the rivets 51b of Figs. 11 to 16, are drawn up tight, so that the slipper bearing end sections 40 remain in alignment with the boss 31 of the slipper bearing unless appreciable force is applied to such bearing end sections. Thus, as shown in Fig. 3, the pivot joints of the link connections 45 may yield under the impact of the tongue 26 to enable the end sections 40 which are under stress to engage the cooperating worn bearing surfaces in the female member 25. However, the end sections 40 which are not under stress are maintained in contact with the bearing surfaces of the female member 25 due to the friction in the pivot joints.

Inasmuch as one of the end sections 40 may tend to wear more than the other end sections in a particular slipper bearing, it may become advantageous to replace a worn or otherwise damaged end section. In the present form of the invention this may be effected by disassembling the coupling and removing therefrom the particular slipper bearing including an end section which it is desired to replace. Once the slipper bearing has been removed from the coupling, a new end section may be substituted for one included in the bearing by removing the pins 51 and connecting the links 45 to the new end section, after which the pins as 51 are installed in the manner hereinabove explained and thereafter the slipper bearing may be reinstalled in the coupling.

In order to enable distribution of a lubricant over the bearing surfaces of the slipper bearing, longitudinally extending grooves 55 are formed in the flat and convex surfaces of each end section 40 along the center lines thereof, as shown in Figs. 5 and 7. These grooves may communicate with other transversely extending grooves, as 56, and preferably the grooves 55 in each end section 40 communicate with each other through a hole 57 extending through such end section. Similarly, longitudinal and transverse grooves 58 and 59, respectively, are formed in the faces of the boss 31, the transverse grooves 59 communicating with the longitudinal grooves 58 and with the opening 35 which receives the bearing pin 33, Fig. 3.

The embodiment of the invention illustrated in Figs. 8, 9 and 10 is generally similar to that described hereinabove, and the corresponding parts are therefore identified in a similar manner, differing only in the addition of the suffix *a* to the reference characters in Figs. 8, 9 and 10. In the form of the invention shown in Figs. 8, 9 and 10, the knuckles 47a of the link connections 45a intermediate the boss 31a and end sections 40a of each slipper bearing are constructed as integral ears on the boss and end sections, respectively, instead of being formed on separate lugs or straps secured to these parts as in the hereinabove described form of the invention. Here again, however, the pivots 51a of the link connections 45a are made tight so that the end sections 40a will yield only when appreciable force is applied to them.

Still another manner of hingedly interconnecting the boss and end sections of each slipper bearing is illustrated in Figs. 11 to 16, inclusive, and a further feature of this embodiment is that the end sections are arranged so that they may be removed from the slipper bearings without disassembly of the universal coupling. In this form of the invention, those parts of the device which correspond to parts in the above described embodiments are identified by the reference characters hereinabove applied to the corresponding parts but the suffix b is added to the reference characters in Figs. 11 to 16.

The boss 31b of each slipper bearing 30b comprises a body 60 of bearing material, Fig. 14, which is molded onto a substantially flat back plate 61, which affords the flat face of the boss 31b. Right-angled flanges 62 are formed on the plate 61 adjacent the edges of the boss 31b opposing the end sections 40b, and the inner faces of these flanges 62 are tapered slightly to form lugs 63, Figs. 14 and 16, which serve to interlock the plate 61 and 60. To further insure a locking interconnection between the plate 61 and the body 60, several recesses 64 having a taper opposite that of the lugs 63 are afforded in the inner faces of the flanges 62, as shown in Fig. 16. The usual bearing pin opening 35b extends through the body 60 and back plate 61 of the boss 31b.

The end sections 40b are connected to the boss 31b by link connections 45b which are constructed as shown in detail in Figs. 15 and 16. Thus, knuckles 47b are formed on the flanges 62 of the plate 61 and project from the end faces 43b of the boss 31b, Fig. 14, and these knuckles 47b receive pins or rivets 51b, Figs. 12 and 14, which pivotally connect links 46b to the knuckles 47b, each knuckle 47b being embraced by the ends of a pair of the links 46b. The opposite ends of each pair of links 46b receive pintles 65 formed on the ends of a pin 66 which serves to space the pair of links 46b. A pair of rods 67 is secured at one end thereof to each pin 66, and these rods extend away from the boss 31b parallel to the longitudinal axis of the slipper bearing. The end sections 40b are provided with suitable longitudinally extending openings to receive the rods 67, each end section 40b having a tight sliding fit on its rods 67 so that it may be moved endwise of the slipper bearing when being assembled thereon or removed therefrom. The outer ends of the rods 67 are threaded to receive nuts 68 which restrain the end sections 40b against such endwise movement when the slipper bearing is in service. The pivot centers of the link connections 45b have a tight frictional fit, as in the case of the previously described embodiments of the invention, to prevent undesired movement of the end sections 40b and to enable the end sections to yield only upon the application of appreciable force thereto by the tongue 26 of the coupling.

To remove an end section 40b from the coupling in which the slipper bearing of which it is a part is mounted, without disassembling the coupling, it is merely necessary to loosen and remove the nuts 68 to enable withdrawal of such an end section. In order to facilitate removal of the end sections 40b from the slipper bearing assembly, tapped openings 69 are provided in the outer ends of the end sections 40b so that a hook or eye as 70, Fig. 15, having a threaded shank may be screwed into the tapped opening 69 of an end section 40b, whereupon this end section may be conveniently withdrawn from the coupling.

In the form of the invention shown in Figs. 11 to 16, the bosses 31b are arranged to seat firmly in the bottom of the recess or groove 28, thereby to attain the wedging action, hereinbefore described, for resisting endwise pounding forces exerted on the pin 33b. The back plate 61 in such instances not only serves as a mounting part for the hinges 45b but also affords protection for the flat face of the boss 31b, thereby to increase the life and effectiveness of the boss sections. This result follows from the location of the back plates 61 so as to bear against the shoulders of the pin 33b, and when the wedging action takes place as hereinbefore described, the compressive forces in the bosses 31b are distributed to the back plates 61 and merely serve to force the metal plates 61 against the shoulders of the pin. Thus a better distribution of forces is assured, and cutting or wear is substantially eliminated.

It will, therefore, be seen that the form of the invention illustrated in Figs. 11 to 16, inclusive, assures the maximum useful life in the various elements and combines the advantages of the double-hinged interconnection between each end section 40b and its associated boss 31b of the slipper bearing with the feature of removability of the end sections.

It will be apparent from the foregoing description that I have provided a useful and practical slipper bearing structure which is so arranged that when the more heavily stressed end section of a slipper bearing is engaged by the male tongue of the universal coupling in the course of transmitting torque between the male and female members, such end section may yield until it receives the support of the cooperating female bearing surface without placing any undue strain upon the bearing structure as a whole. Since the end sections of the present bearing are connected to the boss by a double hinged means it will be evident that any readjusting movement of an end section takes place without imposing objectionable forces upon the boss. Thus the present invention enables the stressed end sections to be readily shifted or rocked about indeterminately positioned transverse axes until they have the maximum possible area of bearing engagement with the worn female bearing surfaces, and even though this action may involve shifting of the inner end of an end section away from the opposed female bearing surface the central boss remains unaffected since the double hinged mounting of each end section is ineffective to transmit the objectionable components of such readjusting movement to the central boss. Moreover, the present invention prevents breakage of the slipper bearings due to endwise pounding of the spindle. These advantages are attained in the present instance by making the slipper bearings of three-piece construction which preserves the general form of the conventional one-piece slipper bearings constructed in accordance with my invention may be employed in existing universal couplings without necessitating any redesigning or reshaping of the male and female members thereof. As shown in the drawings, there are a number of different ways in which I contemplate constructing my novel form of slipper bearings, each embodiment having its particular features which have been pointed out hereinabove.

Thus, while I have illustrated and described selected embodiments of my invention, it is to be understood that these are capable of variation and modification and I therefore do not wish to be limited to the precise details set forth but desire to avail myself of such changes and alterations as fall within the purview of the following claims.

I claim:

1. In a universal coupling including a bifurcated female member and a male member comprising a flat tongue adapted to be received in such bifurcation and which tongue has an opening therein for the reception of a bearing pin and wherein the branches of the bifurcation have opposed arcuate recesses therein that extend transversely and to the free edges thereof and which recesses are enlarged at the medial parts thereof, the combination of a pair of slipper bearings respectively disposed in the arcuate recesses and including convex faces to conform therewith and also having flat faces respectively disposed toward opposed flat faces of said tongue, each of said slipper bearings comprising at least two separate pieces arranged adjacent to each other and being formed to provide a medial boss portion and two end sections disposed at opposite sides of said boss and extending therefrom longitudinally of such slipper bearing, said bosses being of greater depth than said end sections and being seated in the enlarged parts of the arcuate recesses in said female member, a bearing pin extended through the opening in said tongue and into the bosses of said slipper bearings to maintain said bosses seated in the recesses, and hinge means respectively interconnecting the pieces of each individual slipper bearing to enable relative pivotal movement of such parts when the bearing is in service.

2. In a universal coupling including a bifurcated female member and a male member comprising a flat tongue adapted to be received in such bifurcation and which tongue has an opening therein for the reception of a bearing pin and wherein the branches of the bifurcation have opposed arcuate recesses therein that extend transversely and to the free edges thereof and which recesses are deepened at medial parts thereof to form an arcuate groove, the combination of a pair of slipper bearings respectively disposed in the arcuate recesses and including central boss portions located within said groove and separately formed end portions having convex faces to conform with other portions of said recesses and also having flat faces respectively disposed toward opposed flat faces of said tongue, a bearing pin extended through the opening in said tongue and into the medial parts of said bearings, said pin having oppositely facing shoulders thereon acting to space said boss portions apart so that as an incident to the application of a force to said pin transversely thereof and generally toward said groove said boss portions are bottomed in said arcuate groove and are wedged against said shoulders to thereby limit and resist relative endwise approaching movement of said male and female members of the coupling, and link means pivotally connected to the respective end portions and pivotally connected to their respective boss portions to afford two spaced pivotal axes between each end portion and its boss portion to enable such bottoming of said boss portions to be attained under varying conditions of wear in said recesses while such end portions are maintained in effective torque transmitting relation to said other portions of said recesses.

3. In a universal coupling including a bifurcated female member and a male member comprising a flat tongue adapted to be received in such bifurcation and which tongue has an opening therein for the reception of a bearing pin and wherein the branches of the bifurcation have opposed arcuate recesses therein that extend transversely and to the free edges thereof and which recesses are deepened at medial parts thereof to form an arcuate groove, the combination of a pair of slipper bearings respectively disposed in the arcuate recesses and including central boss portions located within said groove and end portions having convex faces to conform with other portions of said recesses and also having flat faces respectively disposed toward opposed flat faces of said tongue, and a bearing pin extended through the opening in said tongue and into the medial parts of said bearings, said pin having oppositely facing shoulders thereon acting to space said boss portions apart so that as an incident to the application of a force to said pin transversely thereof and generally toward said groove said boss portions are bottomed in said arcuate groove and are wedged against said shoulders to thereby limit and resist relative endwise approaching movement of said male and female members of the coupling, and means connecting said end portions to said boss portion for relative movement in a direction substantially perpendicular to said flat faces whereby to enable said boss portions to bottom in said arcuate groove and attain said wedging action under widely varying conditions of wear in said coupling.

4. In a universal coupling including a bifurcated female member and a male member comprising a flat tongue adapted to be received in such bifurcation and which tongue has an opening therein for the reception of a bearing pin and wherein the branches of the bifurcation have opposed arcuate recesses therein that extend transversely and to the free edges thereof and which recesses are deepened at medial parts thereof to form an arcuate groove, the combination of a pair of slipper bearings respectively disposed in the arcuate recesses and including central boss portions located within said groove and end portions having convex faces to conform with other portions of said recesses and also having flat faces respectively disposed toward opposed flat faces of said tongue, and a bearing pin extended through the opening in said tongue and into the medial parts of said bearings, said pin having oppositely facing shoulders thereon acting to space said boss portions apart so that as an incident to the application of a force to said pin transversely thereof and generally toward said groove said boss portions are bottomed in said arcuate groove and are wedged against said shoulders to thereby limit and resist relative endwise approaching movement of said male and female members of the coupling, and a relatively large metallic plate molded into each of said boss portions in position to engage with said shoulders of the pin to thereby protect said boss portions against cutting and wear during wedging operations thereof.

5. A slipper bearing of the character described comprising a boss portion, two separate end sections disposed at opposite sides of said boss and extending therefrom, and means affording link connections between said boss and said end sections.

6. A slipper bearing of the character described comprising a boss portion, at least one end section disposed at one side of said boss and extending therefrom, and means affording a link connection between said boss and said end section.

7. A slipper bearing of the character described comprising a boss, two end sections disposed at opposite sides of said boss and in spaced relation therewith, knuckles provided on the ends of said boss, pins received in said knuckles, links each pivotally mounted at one end thereof on one of said pins, other pins pivotally carried by said links, and means connecting each of said other pins to a respective one of said end sections.

8. A slipper bearing as set forth in claim 7, in which the pivot connections afforded by said pins and said other pins are made sufficiently tight so that the application of force other than gravity is required to cause either of said end sections to pivot relative to said boss.

9. A slipper bearing of the character described comprising a boss, two separate end sections respectively disposed at opposite sides of said boss and in spaced relation therewith, knuckles provided on the opposing faces of said boss and end sections, pins received in said knuckles, and links each pivotally mounted at one end thereof on a pin in a boss knuckle and at the other end thereof on a pin in an end section knuckle to thereby afford a double hinged connection between each end section and said boss.

10. A slipper bearing of the character described comprising a boss, at least one end section disposed at one side of said boss and in spaced relation therewith, knuckles provided on the opposing faces of said boss and end section, pins received in said knuckles, and link means pivotally mounted at one end thereof on the pin in said boss knuckle and at the other end thereof on the pin in said end section knuckle to thereby afford a double hinged connection between said end section and said boss.

11. A slipper bearing of the character described comprising a boss, two separate end sections respectively disposed at opposite sides of said boss and in spaced relation therewith, straps having knuckles formed thereon and respectively secured to said boss and end sections with the respective knuckles in opposed relation, pins received in said knuckles, and links each pivotally mounted at one end thereof on a pin in a boss knuckle and at the other end thereof on a pin in an end knuckle to thereby hingedly interconnect said boss and end sections.

12. A slipper bearing as set forth in claim 11, in which a portion of each of said straps is imbedded in its respective boss or end section, such imbedded portion being provided with projections to interlock the strap and its boss or end section.

13. A slipper bearing of the character described comprising a boss, two separate end sections respectively disposed at opposite sides of said boss and in spaced relation therewith, members partially imbedded in said boss and end sections and carrying knuckles respectively disposed exteriorly of said boss and end sections facing each other, pins received in said knuckles, and links each pivotally mounted at one end thereof on a pin in a boss knuckle and at the other end thereof on a pin in an end section knuckle to thereby hingedly interconnect said boss and end sections.

14. A slipper bearing of the character described comprising a boss, two separate end sections respectively disposed at opposite ends of said boss and in spaced relation therewith, said boss and said end sections having integral knuckles formed on their opposing faces, pins received in said knuckles, and links each pivotally mounted at one end thereof on a pin in a boss knuckle and at the other end thereof on a pin in an end section knuckle to thereby hingedly interconnect said boss and end sections.

15. In a universal coupling including a bifurcated female member and a male member comprising a flat tongue adapted to be received in such bifurcation and which tongue has an opening therein for the reception of a bearing pin and wherein the branches of the bifurcation have opposed arcuate recesses therein that extend transversely and to the free edges thereof, the combination of a pair of slipper bearings respectively disposed in the arcuate recesses and including convex faces to conform with the recesses and also having flat faces respectively disposed toward opposed flat faces of said tongue, each of said slipper bearings comprising a medial boss portion and two separate end sections disposed at opposite sides of said boss and extending therefrom longitudinally of such bearing, a bearing pin extended through the opening in said tongue and interconnecting the bosses of said slipper bearings, each of said bosses including a plate forming the flat surface of such boss, said plate and body having aligned openings therein to receive said bearing pin, knuckles provided on the edges of each such plate facing the aligned end sections, pivot pins received in said knuckles, links each pivotally mounted at one end thereof on one of said pivot pins, other pivot pins carried by said links, and means connecting each of said other pivot pins to a respective one of said end sections.

16. A slipper bearing as set forth in claim 15, in which the edges of said plate on which the knuckles are provided are flanged and tapered inwardly to interlock such plate with the body of the respective boss.

17. A slipper bearing for use in a universal coupling of the character described and comprising a medial boss, two separate end sections disposed at opposite sides of said boss and in spaced relation therewith, devices removably attached to said end sections, and means affording pivotal link connections between said boss and the devices attached to the respective end sections, each of said devices being arranged to enable detachment of its end section and withdrawal of such end section from the universal coupling without requiring withdrawal of said boss from said coupling.

18. An end section for use as an element of a multi-element slipper bearing, said end section comprising an elongated member having an arcuate surface and an oppositely facing substantially flat surface, and a hinge element secured to said member at one end thereof providing a hinge axis located transversely of said member and substantially parallel to said flat surface.

HARRY C. IRVIN.